INVENTOR.
WLADIMIR SELITRENNIKOFF
ATTORNEY

INVENTOR.
WLADIMIR SELITRENNIKOFF
BY
ATTORNEY

INVENTOR.
WLADIMIR SELITRENNIKOFF

BY

ATTORNEY

United States Patent Office 3,427,483
Patented Feb. 11, 1969

3,427,483
DIRECT CURRENT MOTOR WITH HOLLOW, LOW INERTIA ARMATURE AND SPRING-BIASED BEARINGS
Wladimir Selitrennikoff, Anaheim, Calif., assignor to Beckman Instruments, Inc., a corporation of California
Filed Feb. 21, 1966, Ser. No. 529,117
U.S. Cl. 310—45
Int. Cl. H02k 15/12, 9/00, 5/16
13 Claims

ABSTRACT OF THE DISCLOSURE

A direct current motor including an internal cylindrical core extending from an end bell of the motor and an outer field assembly concentrically disposed to form a cylindrical air gap around the internal core, the internal core and outer field forming a high permeability, low leakage magnetic circuit. A hollow cylindrically shaped armature having a high temperature resistant insulating encapsulation deposited over the conductive windings thereof, is supported in cantilever fashion within the air gap. The armature is supported by low friction ball bearing members which are spring-biased to place a pre-loading stress on the balls within their respective races thereby preventing "skidding" during rapid acceleration of the bearings.

---

The present invention relates to electric motors, and is particularly applicable to direct current motors having low inertia, high torque and high speed characteristics.

For direct or gearless actuation of incrementing devices, such as tape transport capstans and various other servo mechanisms, it is common practice to employ direct current electric motors, which have extremely high performance characteristics including fast response to voltage signals (applied to the armature terminations) resulting in extremely rapid acceleration and deceleration of the armature shaft. In order to obtain the necessary acceleration, relatively large current values must be applied to the armature windings and the temperature requirements of such armatures are extremely critical particularly for continuous duty operation.

Accordingly, it is an object of the present invention to provide an improved armature for a direct current motor.

The high speed and the rapid acceleration and deceleration of such devices make it essential that the bearings be of extremely low friction, such as low friction sealed ball bearings. However, when employing ball bearings, it is essential that "skidding" of the balls substantially is minimized or eliminated in order to prevent bearing failure.

It is another object of the present invention to provide an improved bearing support arrangement for the shaft and armature of an electric motor which is adapted for extremely rapid acceleration and deceleration of its armature.

Further objects and advantages of the invention will become apparent as the following description proceeds and the features of novelty which characterize the invention will be pointed out with particularity in the claims annexed to and forming a part of this specification.

For a better understanding of the invention reference may be had to the accompanying drawings in which.

Figure 1:
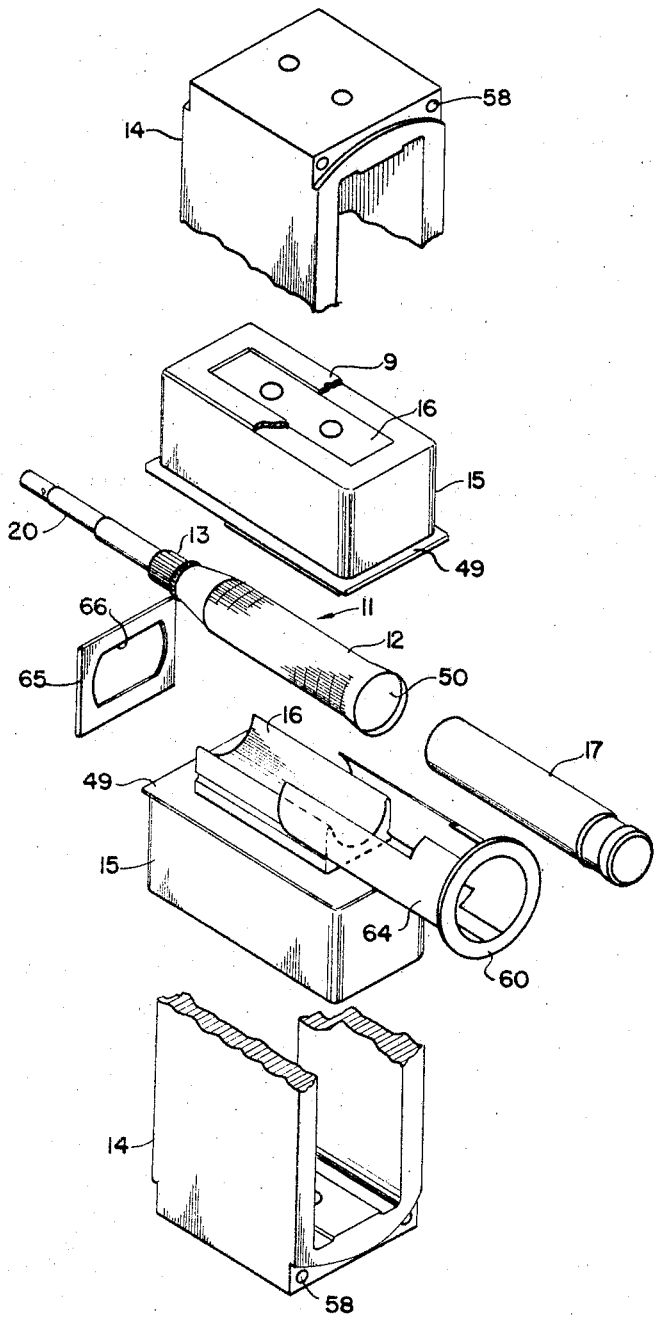
FIGURE 1 is an exploded perspective view of the major components of the motor of the present invention.

Referring now to FIGURE 1, there is shown a preferred embodiment of the invention in exploded form. In this view, the end bells, which support certain components of the motor, are omitted for purposes of clarity. As will be seen in FIGURE 1, the major components of the invention include a hollow core armature generally designated by the reference numeral 11, which includes a winding 12, a commutator 13. In order to provide a field flux for driving the armature of the motor, there is provided a high permeability, low (magnetic) leakage magnetic circuit which is formed by a housing assembly including a field housing 14 having at least a pair of oppositely disposed spaced-apart pole members 16, including field excitation coils 15 wound therearound. While only two pole members are employed in the preferred embodiment of the invention, additional pairs of poles could be employed in the same general manner. While the pole members 16 of the illustrated embodiment are electrically energized, permanent magnetic pole members could be employed for this purpose.

Cooperating with the field housing 14 and pole pieces 16 to form the low-leakage magnetic circuit is a magnetically permeable internal core 17 which fits into the cylindrically shaped hollow armature 11 between the curved annular surfaces of the pole members 16. For reasons of clarity in FIGURE 1, the two end bells are not shown; however, one of the end bells supports the armature assembly 11 through the rotatable shaft 20 and the other end bell supports the cylindrical core member 17. As may be seen in FIGURE 1, an insulating gasket 9 is provided between the surface of the windings 15 on each of the pole members to prevent the field windings 15 from contacting the field housing 14. The portion of the winding 15 closely adjacent the pole surfaces are covered and supported by insulation plates or gaskets 49.

Also shown in FIGURE 1 is an air baffle member 60 having outwardly extending sleeve sections 64 which fit in abutting relation along the sides of the pole members 16 and direct cooling air (as will be explained later in the specification) through the space closely associated with pole members 16 and the armature periphery.

Figure 2:
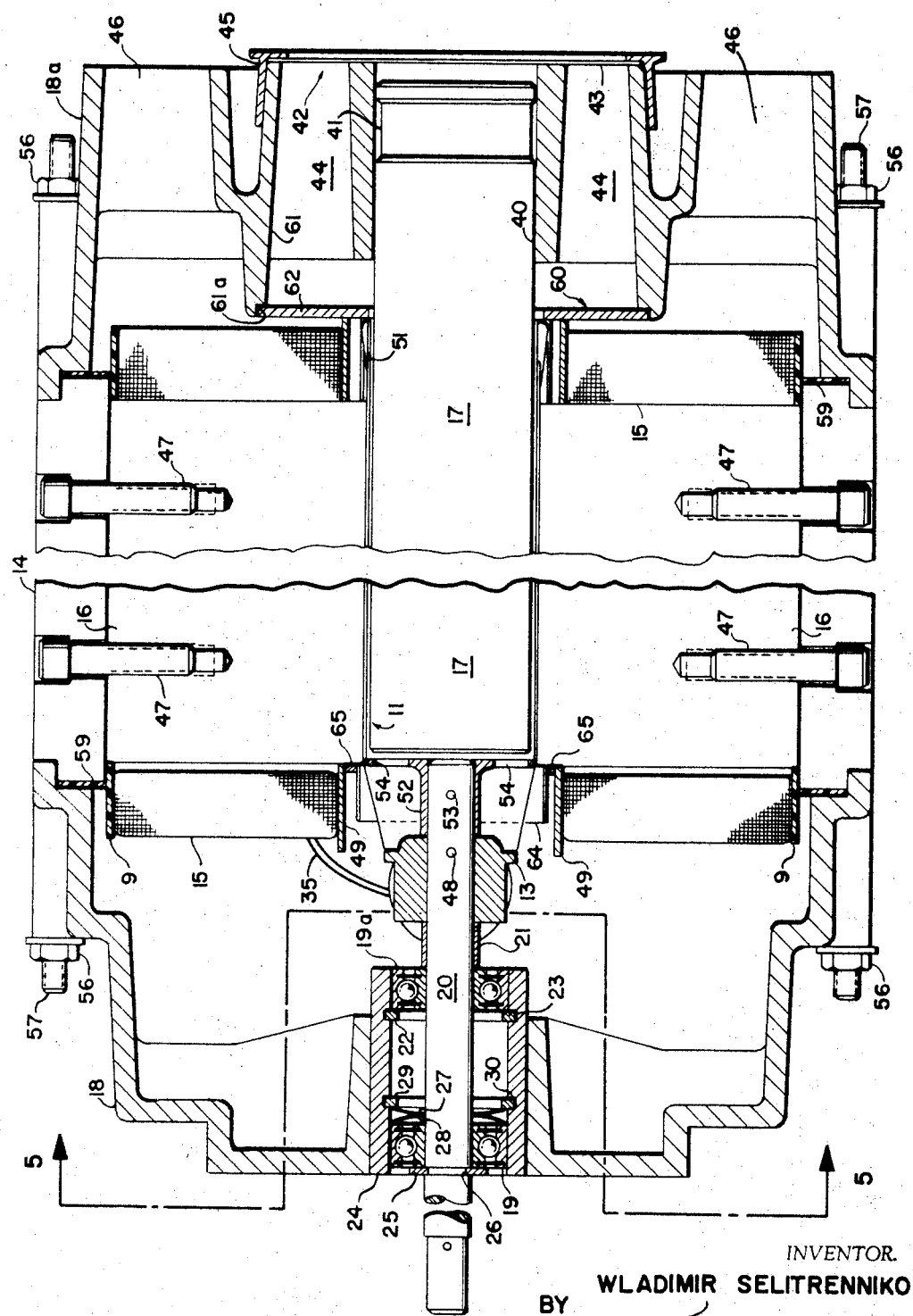
FIGURE 2 is a cross-sectional elevation taken in a plane substantially along the armature shaft of the motor of the present invention.

Referring now to FIGURE 2, a preferred embodiment of the motor is shown in completely assembled form with first and second end bells 18 and 18a respectively affixed to the field housing 14 and enclosing the respective ends of the motor. The end bells 18 and 18a are preferably cast of aluminum or of other non-magnetically permeable material. End bell 18 supports the shaft within a shaft bore formed through the end bell and located axially with respect to the pole members and with the armature being supported in cantilever fashion from the end of the rotatable shaft 20. As may be seen in FIGURE 2, the shaft is supported between a pair of ball bearing members 19 and 19a. Ball bearing members 19 and 19a are of a commercially available type and provide a means for rotatably supporting the shaft in the sleeve 24 disposed in the first end bell 18. Both the inner ball bearing member 19a and the outer ball bearing member 19 are of such a size that they are slideably mounted on the shaft 20 and slideably supported within the sleeve 24. While the tolerances between these respective members are not to be considered loose, the members should be easily moved by hand along the shaft 20 or within the confines of the sleeve 24.

In order to assure proper loading of the bearings and to minimize the "skidding" of the balls within the races of the respective bearings during rapid acceleration and deceleration of the armature and its shaft, there is provided a spring means associated with the sleeve 24 which biases the upper race of one of the ball bearings in a direction parallel to the axis of the shaft. More particularly, as seen in FIGURE 2, a plurality of Belleville and/or finger washer springs 27 and 28 are mounted within the confines of the sleeve 24 with the outer edges or fingers of spring 28 abutting a retaining ring or spring clip 29 appropriately fitted within a groove 30 formed in the sleeve 24. When the springs 27 and 28 are depressed, spring 27 biases the outer race of bearing 19 in the outward direction (toward the left as seen in FIGURE 2) parallel to the axis of the shaft 20. A first stop means 25, in the form of a retaining ring or spring clip 25, is disposed in a groove 26 formed in the shaft 20. The ring or spring clip 25 abuts the inner race of the bearing 19. It can be understood that, when spring force is applied through the bearing 19 against the spring clip 25, this, in turn, forces the shaft in the direction of the spring bias or force against the bearing 19. Thus, in the embodiment of FIGURE 2, the shaft 20 is biased to the left by means of the clip 25 through the bearing 19 and springs 27 and 28. A second stop means is provided adjacent bearing 19a. In this embodiment of the invention, this stop member is in the form of a spacer 21 positioned around the shaft 20 and disposed between the commutator 13 and the inner race of the bearing 19a. Since the commutator 13 is attached to the shaft, any spring bias on the shaft 20 toward the left also exerts a force through the spacer 21 on the inner race of the ball bearing 19a in the same direction, or in the direction of the spring bias. A retaining means is provided in the sleeve adjacent the outer race of the other ball bearing (or bearing 19a) for retaining this ball bearing, the shaft and the first ball bearing 19 against the bias force of the spring. In the embodiment illustrated in FIGURE 2, this retaining means is in the form of a ring or spring clip 22 disposed within a groove 23 formed in the sleeve 24. The outer race of the bearing 19a is forced into engagement with the ring or spring clip 22. The force exerted through the shaft 20 by the spacer 21 against the lower race of the ball bearing 19a forces this ball bearing against the clip 22, which prevents further movement of the ball bearing 19a in the direction of spring bias. Since the shaft 20 cannot move further toward the left as shown in FIGURE 2, all of the bearing members, shaft and springs are retained in their respective positions. Each of the bearings 19 and 19a are spring loaded by a force exerted against the outer race in one direction and the inner race in the opposite direction thereby placing a preloading stress on the balls within their respective races and thereby preventing "skidding" during rapid acceleration of the bearings.

Figure 3:
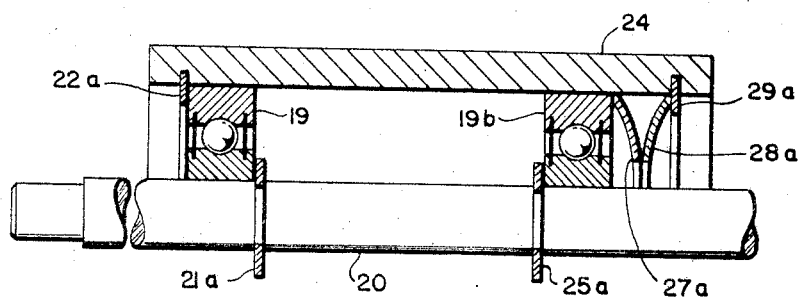
FIGURE 3 is an enlarged partial view in cross-section illustrating a second embodiment of the shaft and bearing assembly.
Figure 4:
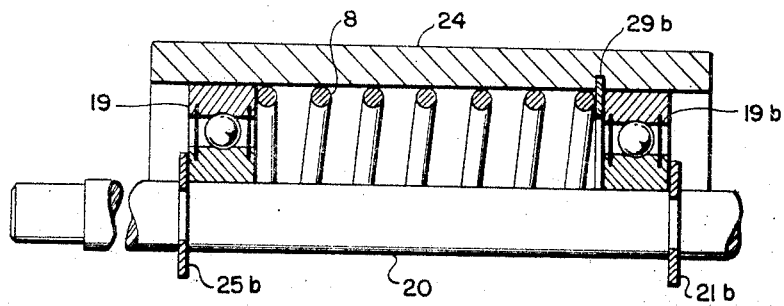
FIGURE 4 is a view similar to FIGURE 3 illustrating still another arrangement of the shaft and bearing assembly.

Referring now to FIGURES 3 and 4, there are shown additional embodiments of the shaft mounting arrangements. As may be seen in FIGURE 3, the sleeve 24 supports a pair of Belleville washers 27a and 28a or other spring-like means by means of a spring clip 29a disposed within a groove formed adjacent the inner end of a sleeve 24. Spring 27a abuts the outer race of the inner bearing member 19b and exerts a force axially thereon. A first stop means or ring 25a, formed within a groove in the shaft, abuts the inner race of the ball bearing member 19b. Through the force exerted upon the ball bearing member 19b, a force is, in turn, exerted against the stop member 25a, in the direction of the spring bias or toward the left as seen in FIGURE 3. A second stop member or spring clip 21a is forced (by the shaft) against the lower race of the outer ball bearing member 19. This, in turn, forces the ball bearing member 19 in the axial direction against the retainer ring 22a which abuts the upper race of the ball bearing member 19. Retainer ring 22a locks the ball bearing members, the shaft and springs in place within the sleeve 24 with the ball bearing members 19 and 19b in a preloaded condition.

Referring now to FIGURE 4, there is shown still another embodiment of the invention in which a retainer ring 29b, supported within a groove in the sleeve 24, retains a coil spring member 8 on one end thereof with the other end thereof abutting the outer race of the outer ball bearing member 19 tending to force the ball bearing member 19 in a direction axially with respect to the shaft. The force exerted on the ball bearing member 19 exerts a force through the inner race of the ball bearing 19 against the stop clip 25b inserted in a groove formed in the shaft 20. The force on the spring clip 25b tends to force the shaft 20 axially to the left until the stop ring or clip 21b abuts the lower race of the inner ball bearing 19b. This in turn places a force axially on the ball bearing 19b causing the outer race of this ball bearing to move into abutting relationship with the retaining ring 29b mounted in the sleeve 24. As in the examples shown in FIGURE 2, the retainer ring 21b could be replaced by a spacer (such as spacer ring 21 of FIG. 2) between the inner race of the ball bearing 19b and the commutator 33.

Figure 5:
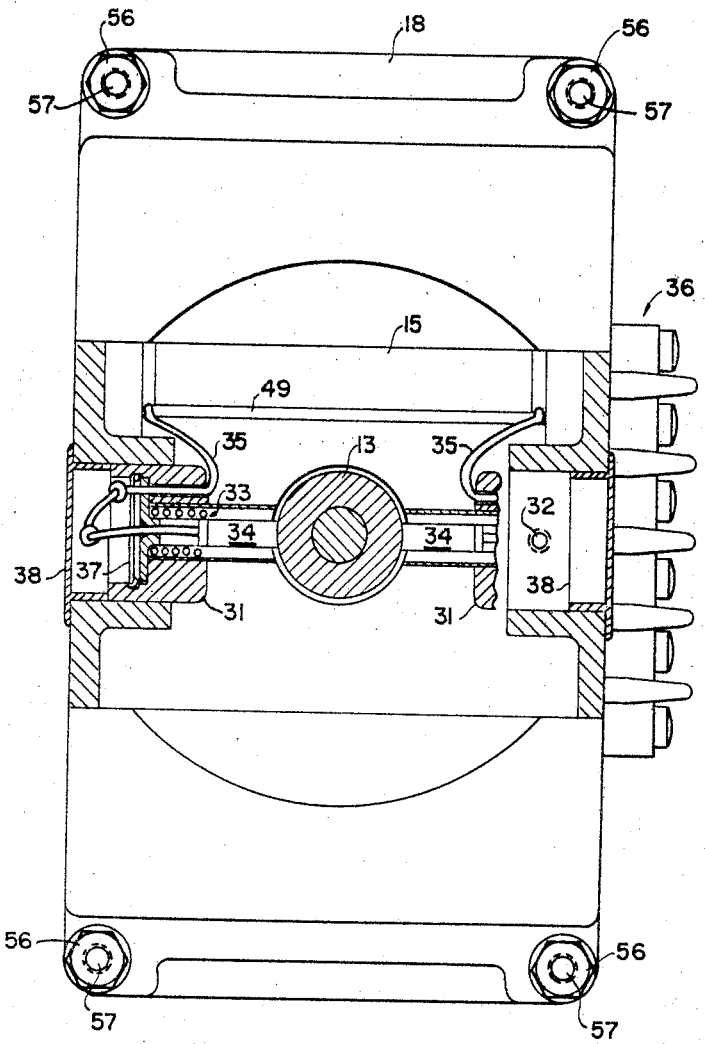
FIGURE 5 is an end view of the motor taken substantially along line 5—5 of FIGURE 2.

As may best be seen in FIGURE 5, the end bell 18 also supports brush holders 31 which are held in place by set screws 32 (only one shown in FIG. 5) formed in suitable shoulders or bosses cast into the end bell 18. The brush holders 31 may be machined or molded members and support conventional brush assemblies 33 having spring loaded brushes 34 forced against the commutator 13 with appropriate pressure. Leads 35 connect the brushes 34 with a terminal board 36 also assembled to the end bell 18. Brush assemblies 33 are held in holders 31 by suitable retaining rings 37 disposed in slots formed in the brush holders. Brush caps 38 plug into the end bell 18 and close the openings to the brush holders thereby allowing easy access to the brushes for replacement purposes.

Referring again to FIGURE 2, the end bell 18a supports the cylindrical inner core 17 which, in turn, cooperates with the field housing to provide a high permeability flux path. As may be seen in FIGURE 2, the internal core 17, which is preferably of magnetic ingot iron, is held in the cylindrical opening or bore 40 formed in the cast end bell 18a by radially and axially positioning set screws (not shown) which engage the end of the internal cylindrical core 17 in the small diameter section 41 formed adjacent the end thereof. While not shown, the cylindrical core 17 may have longitudinal slots or slits to compensate for magnetic axis misalignment and to provide means to adjust the ouput torque for balanced bidirectional operation.

The field housing 14, as may be seen in FIGURES 1 and 2, is an integral unit and supports the pole pieces 16 with their field coils 15 to form a low leakage magnetic circuit. The housing is preferably formed of a plurality of high permeability steel laminations which may be welded, bolted or otherwise connected together.

Pole members 16 are also preferably formed of high permeability steel laminations. As may be seen in FIGURE 2, the pole members 16 are shown affixed to the field housing 14 by bolts 47 and are precisely located with respect to the armature assembly 11 and cylindrical core 17. Pole members 16, in combination with the cylindrical core member 17, produce a high intensity magnetic flux field in the air gap formed between these members. The shape of the pole surfaces are such as to cover a significant portion of the armature winding 12 disposed within the air gap.

The field coils 15, wrapped around each pole piece 16, are preferably formed of a plurality of turns of insulated copper or other siutable electrically conductive wire. As mentioned previously, coil support plates 49 should be of a good insulating material such as glass epoxy, which may be formed into a rigid support for retaining coils 15 in place of the respective pole members 16. Gasket members 9 are disposed between the field housing 14 and the coils 15 to further hold the coils in place and prevent them from electrically contacting the field housing 14.

In operation, direct current excitation is applied to the field coils 15 through an electrical source connected to the terminal board 36. The energized field coils 15, which are connected in series parallel or independently from each other, set up a magnetic flux field following a path through one pole piece 16, through the magnetically permeable core 17, the other pole member 16 and back again through the field housing 14 to the first pole piece. Since the armature windings 12 are positioned around the cylindrical surface of the core 17 and, thus, between the pole members 16, the magnetic flux field passes through opposite lengths of each of the armature windings.

An appropriate direct current source is connected to the armature windings 12 through the segments of the commutator 13 via the brushes 34 which are connected through leads 35 to the terminal board 36. The interaction of the forces produced by the armature winding current and the magnetic flux field in the air gap initiates rapid rotation or oscillation of the armature assembly and the shaft 20.

Figure 6:
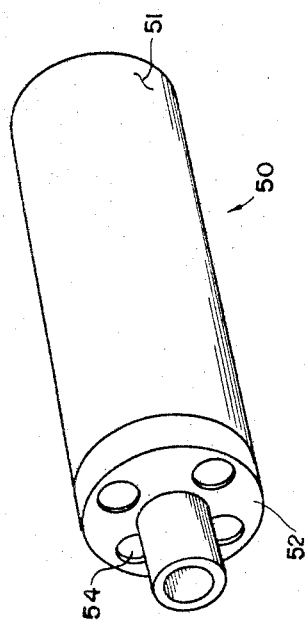
FIGURE 6 is a perspective view of the armature support cylinder.
Figure 8:
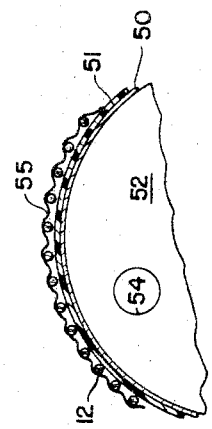
FIGURE 8 is an enlarged cross-sectional view of the armature taken along line 8—8 of FIG. 7.
Figure 7:
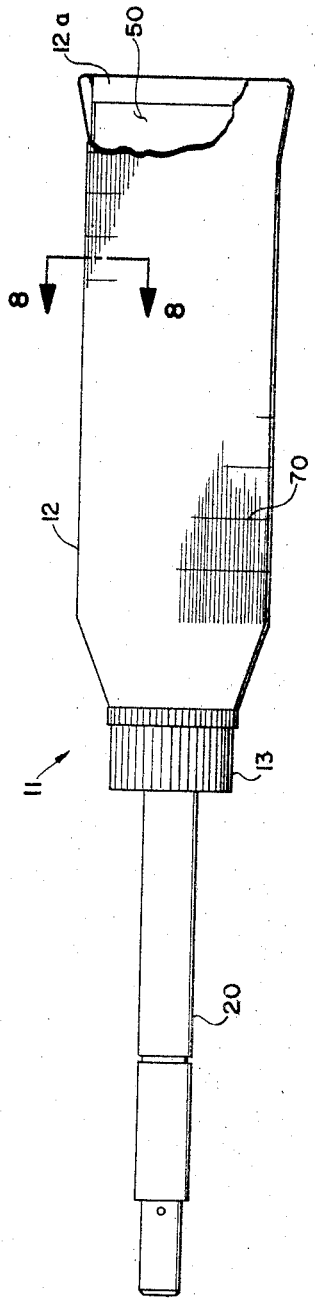
FIGURE 7 is an elevation view of the armature and shaft assembly.

Referring now to FIGURES 6, 7 and 8, the armature assembly 11 is shown to comprise longitudinal member in the form of a hollow, open-ended, low inertia cylindrical or tubular support 50, a winding 12 and a commutator 13. The longitudinal member or cylindrical support 50 is preferably fabricated of a non-magnetic material, such as stainless steel which may be extremely thin yet provide an extremely high strength to weight ratio. Depending upon the temperature, driven inertia and torque requirements of the motor, other materials, such as epoxy glass, phenolic, aluminum, copper or the like may be suitable for this purpose. The socket disc 52 is attached to one end of support 50 by brazing, or some other suitable technique, depending upon the type of materials employed. Socketed disc 52 accepts the shaft 20 and is rigidly attached thereto by a pin 53 (seen in FIG. 2). A plurality of holes or openings 54 are provided in the socket disc 52 to permit the passage of air for cooling purposes and to help minimize the armature weight.

The external surface of the cylindrical support 50 is preferably coated with a high temperature insulating material, such as a high temperature electrically insulating ceramic, or sprayed with a high temperature insulating paint, such as a polymerized silicon base paint of the type sold under the trade name "Sperex" by the Sperex Corporation. The armature coils or windings 12 are positioned on the cylinder 50 to form essentially parallel conductors which are longitudinally arrayed in a single cylindrical layer over the insulation 51. The end turns 12a are formed around the end of the cylindrical support 50 in a conventional manner and, for a two pole motor of the type described, the opposite lengths of each coil are disposed on the opposite sides of the cylinder 50. Preferably, the coils or windings 12 are formed of an anodized aluminum magnet wire, which may take high current flow and be employed at extremely high operating temperatures. However, for lower operating temperatures, other wire such as film insulated aluminum or copper magnet wire may be used in conjunction with an appropriate insulating material such as epoxy varnishes, etc.

The opposite ends of the respective coils of the winding 12 are suitably connected, by appropriate soldering or welding techniques, to the commutator 13 which may be mounted on the shaft 20. After the coils are placed on the cylinder 50 they are appropriately bonded or cemented into place on the cylinder in order to avoid mechanical displacement of the coils during operation. In practice, it is desirable to employ a ceramic insulation material 55 similar to that employed on the surface of the cylinder 50 for this purpose. Several layers of a high temperature insulating paint, such as the aforementioned polymerized silicon base paint "Sperex," may be sprayed over the windings for high temperature encapsulation purposes. The ceramic encapsulation 55 provides a high temperature bond between the winding 12 and the insulation support 51 and firmly retains the winding in place. To assure that the windings are firmly retained, it may be desirable to wrap them with a banding material 70 at selected intervals along the length of the cylindrical support 50. For high temperature operation a glass filament banding material may be employed for this purpose.

In order to further enhance the high temperature motor characteristics, there is provided a cooling system for the armature and its windings 12 which carries away a substantial portion of the heat generated by the extremely high armature current. As may be seen in FIG. 2, the end bell 18a is provided with air passages or ports 46 that may be connected to an external vacuum system or blower system. When a vacuum system is used, this arrangement draws air outwardly from within the motor housing through the ports 46. Since the remaining portions of the motor are sealed, air enters the motor housing through a plurality of inlet ducts or ports 44, which are provided for this purpose around the center support sleeve 40. Air inlet ducts 44 are preferably arranged uniformly around the external portions of the cylindrical core 17 and the support sleeve 40. Divider walls or baffles 61, cast into the end bell housing 18a, cooperate to separate the inlet and outlet air flow paths.

Figure 9:
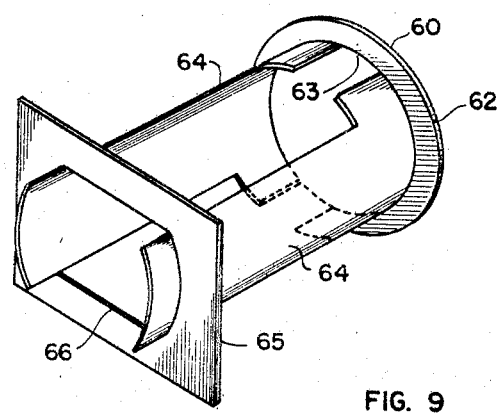
FIGURE 9 is a perspective view of the air flow gasket baffle.

In addition to walls 61, means are provided to prevent the cooling air stream from bypassing the space closely associated with the pole members 16 and armature periphery. For this purposes there is provided a baffle member 60 having an annular end ring 62 designed to fit in the relieved section 61a of the wall 61. The shape of the baffle may best be seen by referring to FIGURE 9. The baffle is preferably formed of a resilient plastic or synthetic rubber material, such as neoprene, or some other material capable of withstanding high temperature. The baffle member 60 directs the air flow around the armature winding 12 through the clearances of the air gap. The baffle 60 is provided with a cylindrical ring 62, having a central air opening 63, and a pair of outwardly extending longitudinal arms or sleeve sections 64 adapted to extend into the space formed between the pole members of the motor. Sleeves 64 are preferably curved and, as may be seen in FIG. 1, the upper and lower edges of the sleeves abut against the side surfaces of the pole pieces 16, forming a confined air flow path in the region of the air gap. The extended portions of the sleeve 64, closely adjacent the ring 62 are of sufficient extent to abut aaginst the upper and lower coil support plates 49 and close off this possible avenue of air escape. A rectangular shaped support member 65, having an opening 66, slides over the ends of the sleeevs 64 of the baffle member and supports the sleeves in position along the sides of the pole members 16. Support member 65 can be formed of any non-conductive material, such as the glass epoxy of the type preferably used for the support plates 49. The rectangular support 65 rests between the support plates 49.

In operation with a vacuum system attached to ducts 46, cooling air is forced to flow axially around the armature winding, commutator and brush holder extensions and carries a substantial portion of the heat generated by the armature coils 12 and the cylindrical core 17 into the end bell section 18 where the air is then drawn around the pole members 16 and their respective field windings 15 to be discharged out the outlet ducts 46 formed in the end bell 18a. A filter 43 (see FIG. 2) is disposed across the openings of the inlet air ducts 44. The filter 43 is retained in position over this end section of the end bell 18a by means of a filter cap 45 which may be removed for replacement or cleaning of the filter 43.

Referring again to FIGURE 2, the end bells 18 and 18a are attached to the field housing 14 by means of nuts 56 and tie-rods 57 which pass through the holes 58 (shown in FIG. 1) of the field housing. Gaskets 59 seal the bell and field housing junctions.

While, in accordance with the patent statutes, there has been shown and described what at present is considered to be the preferred embodiments of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. An electric motor comprising:
   a housing including a pair of spaced-apart end bells, one of said end bells having an annular sleeve for supporting an armature shaft;
   a cylindrical internal core of magnetically conductive material supported in cantilever fashion from one of said end bells;
   a field housing disposed between said end bells and cooperating with said internal core to form a high permeability, low-leakage magnetic circuit, said field housing including at least a pair of oppositely disposed spaced-apart pole members having annular surfaces concentrically disposed with respect to the surface of the said cylindrical internal core thereby to form an annular air gap;
   a hollow cylindrically shaped armature disposed within said air gap, said armature having a commutator and a plurality of conductive windings attached thereto and extending for at least a portion of the length of said armature within said air gap;
   a rotatable shaft attached at one end to said cylindrically shaped armature and rotatably supporting said armature in cantilever fashion therefrom within said air gap; and
   means rotatably supporting said shaft in said sleeve of said one end bell of said housing comprising:
      inner and outer ball bearing members slideably mounted on said shaft and slideably supported within said sleeve,
      spring means associated with said sleeve biasing the outer race of one of said ball bearings in a direction parallel to the axis of said shaft,
      a first stop means on said shaft abutting the inner race of said biased ball bearing applying a force in the direction of said spring bias to said shaft through said ball bearing,
      a second stop means on said shaft adjacent the inner race of said other ball bearing biasing said other ball bearing in the direction of said spring bias,
      retaining means in said sleeve adjacent the outer race of said other ball bearing retaining said other ball bearing said shaft and said first ball bearing against said bias force of said spring, and
      electrically conductive brush means mounted in said housing in contact with said commutator for conducting an electrical current to said armature windings.

2. The electric motor defined in claim 1 wherein said spring means comprises a plurality of springs disposed in said sleeve with said shaft extending through a hole in said springs, one of said springs abutting the outer race of one of said bearings, and another of said springs having its outer edge retained against axial movement by a spring clip member disposed in a groove formed in said sleeve.

3. The motor defined in claim 1 wherein said spring means comprises a compression coil spring supported at one end within said sleeve by a spring clip disposed in a groove formed in said sleeve, said spring having its other end in abutting relationship with the outer race of one of said ball bearings.

4. The electric motor defined in claim 1 wherein said inner ball bearing member is biased in a direction away from said field housing and there are provided a pair of spring clips mounted respectively in a pair of grooves formed around said shaft, said spring clips being in abutting relationship with the inner races of said inner and outer ball bearing members so that the biasing force on the inner race of said inner ball bearing is transmitted through said inner ball bearing and said shaft to said inner race of said outer ball bearing and the retaining means in said sleeve comprises a spring clip disposed in a groove around said sleeve abutting the outer race of said outer ball bearing thereby retaining said outer ball bearing, said shaft and said first ball bearing against said biasing force of said spring.

5. In combination with an electric motor having a field housing disposed between a pair of end bells and an armature supported on a shaft journaled through one of said end bells, a bearing means for rotatably supporting said shaft in one of said end bells of said housing comprising:
   an axial bore formed in said end bell;
   inner and outer ball bearing members slideably mounted around said shaft and slideably supported within said bore of said end bell;
   spring means associated with said bore biasing the outer race of one of said ball bearings in the direction parallel to the axis of said shaft;
   a first stop means on said shaft abutting said inner race of said biased ball bearing applying a force in the direction of said spring bias to said shaft through said ball bearing;
   a second stop means on said shaft adjacent the inner race of said other ball bearing forcing said other ball bearing in the direction of said spring bias; and
   retaining means in said bore adjacent the outer race of said other ball bearing retaining said other ball bearing said shaft and said first ball bearing against said bias force of said spring.

6. An electric motor comprising:
   a housing including a pair of spaced-apart end bells;
   a cylindrical internal core of magnetically permeable material supported in cantilever fashion from one of said end bells;
   a field housing disposed between said end bells and cooperating with said internal core to form a high permeability, low leakage magnetic circuit, said housing including at least a pair of oppositely disposed spaced-apart pole members having annular surfaces concentrically disposed with respect to the surface of said cylindrical internal core thereby to form an annular air gap;
   a rotatable shaft;
   means for rotatably supporting said shaft through one of said end bells of said housing;
   an armature comprising:
      a hollow cylindrically shaped cylinder formed of nonmagnetically permeable material,
      support means on one end of said cylinder supporting said cylinder in cantilever fashion on the end of said rotatable shaft extending into said housing,
      a high temperature insulating coating formed on the external surfaces of said cylinder,
      a commutator adjacent said support means for said cylinder and a plurality of conductive windings attached to said commutator and extending at least a portion of the length of said cylinder, and a high temperature resistant insulating encapsulation deposited over the portion of said conductive windings on said cylinder; and electrically conductive brush means mounted in said housing in contact with said commutator for conducting an electrical current to said armature windings.

7. The electric motor defined in claim 6 in which said insulating coating on the external surfaces of said cylinder and said insulating encapsulation deposited over said conductive windings comprises a high temperature insulating ceramic material.

8. The electric motor defined in claim 6 in which said insulating coating and said insulating encapsulation comprises a polymerized silicon base material.

9. The electric motor defined in claim 6 in which said conductive windings are disposed substantially longitudinally in a single layer on the surface of said cylinder and said windings are at least partially supported in position on said cylinder by a high temperature resistant insulating encapsulation formed of a polymerized silicon base material.

10. The electric motor defined in claim 6 in which said conductive windings of said armature are formed of an anodized aluminum magnet wire.

11. In an electric motor adapted for high temperature operation including a field housing supported between a pair of end walls and a rotatable shaft journaled at least through one of said end walls, the combination of a high temperature armature mounted on said shaft comprising:

a longitudinal support member mounted on said shaft and extending into said field housing, a commutator disposed at one end of said support member and a plurality of conductive windings attached to said commutator and extending at least a portion of the length of said support member, and a high temperature resistant insulating encapsulation deposited over the portion of said conductive windings on said support member, said high temperature resistant insulating encapsulation comprising a polymerized silicon base material.

12. An electric motor comprising:

a housing including first and second spaced-apart end bells, said first end bell having an annular sleeve for supporting an armature shaft;

a cylindrical internal core of magnetically permeable material supported in cantilever fashion from said second end bell;

a field housing disposed between said end bells and cooperating with said internal core to form a high permeability, low-leakage magnetic circuit, said field housing including at least a pair of oppositely disposed spaced-apart pole members having annular surfaces concentrically disposed with respect to the surface of said cylindrical internal core thereby to form an annular air gap;

a hollow cylindrically shaped armature disposed within said air gap, said armature having a commutator and a plurality of conductive windings attached thereto and extending at least a portion of the length of said armature within said air gap;

a rotatable shaft attached at one end to said cylindrically shaped armature and supporting said armature in cantilever fashion therefrom within said air gap;

means for rotatably supporting said shaft in said sleeve of said one end bell of said housing;

air cooling means for said armature windings including:

an air inlet opening in said second end bell adjacent the end of said internal core attached to said second end bell, an air outlet opening in said second end bell externally of said inlet openings, baffle means disposed on one side of said field housing for separating said inlet air flow stream from said outlet air flow, said baffle means including a resilient gasket member having curved longitudinal sleeve sections disposed between said spaced-apart pole members for the length of said field housing, said sleeve sections and said pole members encompassing a region including said air gap between said pole members and confining said inlet air flow through said region and said air gap; and electrically conductive brush means mounted in said housing in contact with said commutator for conducting an electrical current to said armature windings.

13. The electric motor of claim 12 in which said baffle means is formed of an annular resilient gasket disposed on one side of said field housing, said longitudinal sleeve sections protruding from said gasket and being disposed between said spaced-apart pole members for the length of said field housing and further including a support gasket disposed on the opposite side of said field housing from said annular gasket and having an opening therein through which said sleeve sections protrude so that said sleeve sections are retained in sealing relation against the sides of said pole members.

References Cited

UNITED STATES PATENTS

| 2,545,855 | 3/1951 | Luenberger | 310—58 |
| 2,837,669 | 6/1958 | Fisher et al. | 310—45 |
| 2,974,242 | 3/1961 | Apstein | 310—266 |
| 3,290,528 | 12/1966 | Adler et al. | 310—266 |
| 3,319,098 | 5/1967 | Hartman | 310—90 |
| 3,356,877 | 12/1967 | Burr | 310—266 |

WARREN E. RAY, *Primary Examiner.*

U.S. Cl. X.R.

310—58, 90, 177, 266